United States Patent
Lepretre

(10) Patent No.: US 9,982,556 B2
(45) Date of Patent: May 29, 2018

(54) TURBINE ENGINE COMPRISING A DRIVE SYSTEM FOR A DEVICE SUCH AS AN ACCESSORIES CASE

(71) Applicant: Safran Aircraft Engines, Paris (FR)

(72) Inventor: Jean-Baptiste Etienne Bernard Lepretre, Moissy-Cramayel (FR)

(73) Assignee: SAFRAN AIRCRAFT ENGINES, Paris (FR)

( * ) Notice: Subject to any disclaimer, the term of this patent is extended or adjusted under 35 U.S.C. 154(b) by 0 days. days.

(21) Appl. No.: 15/317,335

(22) PCT Filed: Jun. 11, 2015

(86) PCT No.: PCT/FR2015/051547
§ 371 (c)(1),
(2) Date: Dec. 8, 2016

(87) PCT Pub. No.: WO2015/189522
PCT Pub. Date: Dec. 17, 2015

(65) Prior Publication Data
US 2017/0122122 A1 May 4, 2017

(30) Foreign Application Priority Data

Jun. 12, 2014 (FR) ..................... 14 55346

(51) Int. Cl.
*F01D 15/10* (2006.01)
*F01D 15/12* (2006.01)
(Continued)

(52) U.S. Cl.
CPC ............. *F01D 15/12* (2013.01); *F01D 15/08* (2013.01); *F01D 15/10* (2013.01); *F01D 25/04* (2013.01);
(Continued)

(58) Field of Classification Search
CPC .. F01D 15/10; F01D 15/12; F02C 7/32; F02C 7/36; F05D 2220/50
See application file for complete search history.

(56) References Cited

U.S. PATENT DOCUMENTS 2,803,943 A * 8/1957 Sinclair ..................... F02C 7/32
60/262
6,058,791 A * 5/2000 Brunet ...................... F02C 7/32
192/69.9
(Continued)

FOREIGN PATENT DOCUMENTS

EP 2 381 080 A2 10/2011
FR 2 921 423 A1 3/2009
(Continued)

*Primary Examiner* — Justin Seabe
(74) *Attorney, Agent, or Firm* — Blank Rome LLP

(57) ABSTRACT

The present invention relates to a turbine engine (10) comprising:
  at least one hollow guidance arm (44) radially extending from a hub (38) to an annular housing (42), and having one radially external end which opens out in an opening (60) of said annular housing,
  a radial countershaft (48) located in said guidance arm (44) for rotatably driving at least one device arranged at the periphery of said annular housing (42).
According to the invention, a transfer case (50) is disposed facing the opening (60) of the annular housing, and the turbine engine comprises rotational power transfer means (78, 52) between the radial countershaft (48) and the device, with the guidance arm (44) being equipped, at the external end thereof, with a widened section (56) by which it opens out in the opening (60) of the annular housing and in which part of the transfer case (50) is accommodated.

11 Claims, 2 Drawing Sheets

(51) Int. Cl.
*F01D 15/08* (2006.01)
*F01D 25/24* (2006.01)
*F01D 25/04* (2006.01)
*F01D 25/16* (2006.01)
*F01D 25/20* (2006.01)
*F02C 7/32* (2006.01)

(52) U.S. Cl.
CPC ............ *F01D 25/16* (2013.01); *F01D 25/20* (2013.01); *F01D 25/24* (2013.01); *F02C 7/32* (2013.01); *F05D 2220/30* (2013.01); *F05D 2240/60* (2013.01); *F05D 2260/96* (2013.01)

(56) References Cited

U.S. PATENT DOCUMENTS

| | | | |
|---|---|---|---|
| 6,764,276 B2* | 7/2004 | Mulcaire | F01D 5/00 415/119 |
| 8,038,386 B2* | 10/2011 | Duchatelle | F01D 9/065 415/122.1 |
| 9,145,834 B2* | 9/2015 | Frost | F02C 7/32 |
| 9,657,646 B2* | 5/2017 | Wotzak | F01D 9/041 |
| 2008/0148881 A1* | 6/2008 | Moniz | F02C 7/32 74/15.6 |
| 2013/0319140 A1 | 12/2013 | Brault et al. | |
| 2014/0060079 A1* | 3/2014 | Foster | F02C 7/20 60/798 |
| 2014/0090386 A1* | 4/2014 | Cloft | F02C 7/32 60/772 |
| 2014/0135134 A1 | 5/2014 | Duchatelle et al. | |

FOREIGN PATENT DOCUMENTS

FR 2 971 816 A1 8/2012
WO WO 2008/082334 A1 7/2008
WO WO 2012114029 A1 * 8/2012 ................ F02C 7/32

* cited by examiner

TURBINE ENGINE COMPRISING A DRIVE SYSTEM FOR A DEVICE SUCH AS AN ACCESSORIES CASE

The invention relates to a turbine engine comprising a drive system for a device such as an accessories case of the turbine engine. Conventionally, an accessories case is a device used to support and mechanically drive other devices called accessories, such as electric generators, oil or fuel pumps, or other pumps, necessary for the operation of the turbine engine or the aircraft on which the turbine engine is mounted. To provide such driving, the power required is taken off from a main shaft of the turbine engine, usually through a radial countershaft meshed with the main shaft, to mechanically transmit this power to the accessories case.

A twin spool turbofan engine comprises two coaxial shafts, one so-called low pressure or BP shaft, connecting the low pressure compressor to the low pressure turbine and forming together the LP cylinder, the other one, so-called high pressure or HP shaft, connecting the high pressure compressor to the high pressure turbine and forming together the HP cylinder. In the case of such a motor, the radial countershaft is generally accommodated in a structural support arm of an annular housing through which the secondary stream passes, with such annular housing being generally called intermediate housing. A radially internal end of the radial countershaft generally comprises a bevel gear cooperating with a pinion integral with the main shaft formed by the high pressure cylinder. The other end is mechanically connected to the accessories case comprising a plurality of gears providing the driving of the other devices, i.e. the accessories. When the engine is a turbofan engine, the radial countershaft passes through both jets of the primary and secondary streams respectively since the accessory case, also called AGB, for "Accessory Gear Box" is usually mounted externally on the casing of the fan generating the secondary stream.

The aircraft manufacturer may specify to mount the accessories case approximately in the angular sector of six or eight of the turbine engine. To allow the driving of the auxiliary devices, i.e. the accessories, forming a first structural arm at six, used as a support of the intermediate housing and connecting the hub of the turbine engine to the intermediate housing, a second similar structural arm at twelve, and a third structural arm oriented to eight or four, with said third arm being dedicated to the passage of a countershaft toward an accessory case extending the shaft extension is common, as illustrated in the document FR2971816A1 and in particular with reference to FIG. 2 of said document. The structural arms is also used for guiding pipes and harnesses between a central compartment and a fan compartment of the turbine engine. However, this case thus involves forming at least three radial arms through at least the secondary jet of the engine, without requiring special positioning symmetry, such as the arms 44 shown in FIG. 2 of this document. However, it has been demonstrated that the presence of at least three arms, as in the cases above, destabilizes the flow of the stream and creates disturbances, which reduces the aerodynamic performance of the turbine engine.

In order to optimize the flow of at least the secondary stream, the applicant has sought to keep only two structural arms supporting the intermediate housing, one at twelve, and the other one at six. These two arms are thus symmetrically positioned in the flow jets, and are less interfering than a mounting involving three or more arms, thereby eventually improving the aerodynamic performances of the turbine engine. Because of the vertical overall dimensions of the engine, the accessories case is positioned in a direction angularly relatively far from the arms at six and twelve, for example approximately at eight, in the turbine engine. In this case, the arm at six not only accommodates pipes and harnesses but also the radial countershaft used for driving a device such as an accessories case and thus eventually driving auxiliary devices, i.e. the accessories.

A major difficulty, however, hinders the achievement of a configuration as described above. As a matter of fact, such an embodiment necessarily involves the provision of power transfer means outside the intermediate housing, between the radially external end of the radial countershaft formed at six on the turbine engine and the housing of accessories formed approximately at eight on the turbine engine. These means necessarily imply the presence of large components, in particular used to resume the rotation of the radial countershaft to transfer same, along another axis, for example substantially tangential to the intermediate housing of the turbine engine, to the accessory case. Such parts will, for example take the form of a conical pinion engaged with the radial countershaft, and adapted to be connected to a tangential transfer shaft, and shall also be in a lubricated stationary enclosure allowing a precise positioning of the parts relative to each other. In the case referred to in the present document, the nacelle which surrounds, holds and protects the turbine engine, and the dimensions of which are imposed by the aircraft manufacturer, only leaves a much reduced radial gap around six on the turbine engine between the intermediate housing and a cowling of the nacelle in order to limit the vertical overall dimensions of the nacelle. The positioning of the transfer means is not easy and requires careful consideration on the integration thereof.

The present invention thus provides a simple, effective and economic integration of the aforementioned transfer means.

To this end, it proposes a turbine engine such as a turbojet or a turboprop, extending along a motor axis and comprising:
- at least a hollow guidance arm extending radially with respect to the engine axis from a hub to an annular housing of the turbine engine, and having a radially external end which opens at an opening of said annular housing,
- a radial countershaft located in said guidance arm and intended for rotating at least one device arranged on the periphery of said annular housing, characterized in that it further comprises a transfer case arranged facing the opening of the annular housing and comprising rotational power transfer means between the shaft and the device, and in that the guidance arm is provided, and in particular has, at its radially external end a widened section by which it opens on the opening of the annular housing and in which a portion of the transfer case is accommodated.

In the present document, a guidance arm of an intermediate housing refers to a structural arm supporting the intermediate housing which can be used for the passage of electrical harnesses and pipes, or even for the passage of a radial countershaft.

The invention thus makes it possible to adapt a guidance arm of an intermediate housing so that it can accommodate at least a portion of the transfer case at its radially external end. Whereas the section of a guidance arm is usually so dimensioned as to accommodate no more than one countershaft as well as harnesses and lines only, the guidance arm here has a radially external hollow portion having a larger, thus widened, cross-section, positioned inside the intermediate housing, and which has the space necessary to accommodate a portion of the transfer case. The transfer case is thus partially positioned radially inside the intermediate housing, which makes it possible to install the housing in the small radial space left outside the housing to a cowling of the nacelle, and therefore solves the integration problems mentioned above.

Besides, the invention makes it possible to shorten the length of the transfer shaft, since the latter is then connected to the transfer means at a shorter radial distance from the central axis of the turbine engine. This aspect is particularly advantageous since it allows to make the following changes to the turbine engine:

either increasing the critical speed of rotation of the countershaft as a result of the reduction in length of the shaft and without increasing the shaft diameter, which improves the operating safety margins of the turbine engine, or increasing the operating speed of the turbine engine without the speed of rotation of the shaft exceeding the critical speed and therefore without the risk of damaging the shaft;

or reducing the diameter of the countershaft, while retaining its original critical speed of rotation, which makes it possible to reduce the size of the section of the guidance arm over its entire length, except for the widened portion, and then improves the aerodynamic performance of the turbine engine.

As regards the prior document FR2921423, it should be noted that none of the bevel gears 41 and 43 belongs to the guidance arm 33/38 concerned. As a matter of fact, the bevel gear 41 is fixed to the end of the high pressure drive shaft 33 and the bevel gear 43 is fixed to the end of the low pressure drive shaft 38. These are therefore added parts. More particularly, no guidance arm is provided with, and in particular has, at its radially external end, a widened portion as in the invention.

The turbine engine of this solution is preferably a turbofan engine, and the guidance arm passes through a secondary stream jet of the turbine engine.

The rotational power transfer means of the transfer case preferably comprises a hollow shaft comprising:

splines inside a radially internal end of the hollow shaft, with said splines being meshed between external splines formed at a radially external end of the countershaft, and a bevel gear coaxial with the hollow shaft, with the hollow shaft of the transfer case being held by bearings disposed inside an enclosure of the transfer case, with said enclosure being partly positioned in the radially widened portion of the guidance arm inside the annular housing.

In a particular embodiment, the enclosure of the transfer case comprises a main portion and a linking portion sealingly connected to the main portion, and at least one of said bearings is positioned at an opening of the main portion whereto the linking portion is connected.

According to another characteristic, at least one of said bearings is partly located radially at the opening of the annular housing.

The entire structure of the transfer case is thus closer to the central axis of the turbine engine, while taking advantage of the space available in the widened portion of the guidance arm.

Advantageously, the enclosure of the transfer case comprises an opening through which the hollow shaft of the transfer case extends, with said opening being sealingly connected to the widened portion of the guidance arm so as to form a single sealed cavity comprising the inside of the guidance arm and the inside of the enclosure. Sealing means connecting the enclosure to the guidance arm may advantageously be arranged inside the annular housing of the turbine engine.

Such sealing between the guidance arm and the enclosure of the transfer case makes it possible, in particular, to position a common lubricating circuit between the guidance arm and the transfer case, wherein shafts are rotated in one piece.

According to another characteristic of the invention, the radially outer end of the radial countershaft is located radially inside the turbine engine housing. The countershaft is therefore shorter than in the prior art, where it extends radially beyond the turbine engine housing. This results in the advantages already mentioned above.

Advantageously, the widened portion of the guidance arm may comprise at least one flange secured to the housing of the turbine engine from the inside. Such flange makes it possible to position and fix the guidance arm relative to the turbine engine housing, which ensures its structural holding in the turbine engine.

Advantageously, the turbine engine further comprises an oil drain circuit of the transfer case, wherein at least two oil recovery pumps are connected to two oil discharge ports respectively, with each one going through a bottom wall of the transfer case.

These two oil discharge ports are preferably distant from each other in a transverse direction of the turbine engine.

These pumps enable the oil draining of the oil circuit regardless of the position and slope of the turbine engine in operation. As a matter of fact, when the turbine engine is aboard an aircraft, according to the phases of flight, the turbine engine may be sloping to one side or the other with respect to the horizontal. Depending on such phases of flight, the pumps will be able to drain oil either simultaneously or in turns.

In a preferred case, the turbine engine will comprise two guidance arms extending substantially radially from two opposite sides of the hub to the annular housing of the turbine engine, with the transfer case being disposed radially outward relative to one of the guidance arms.

Preferably, the two opposed guidance arms are respectively an upper guidance arm and a lower guidance arm extending substantially vertically, with the transfer case being disposed under the lower guidance arm.

A transfer shaft may rotatably connect the transfer case to an accessory case of the turbine engine positioned on the periphery of the annular housing of the turbine engine in an angular sector different from the angular sectors where two opposite guidance arms are located, i.e. the upper guidance arm and the lower guidance arm. The driving of the devices connected to the accessory case is thus ensured, although the latter is not located facing the radial countershaft.

Advantageously, the accessory case may bear one electric generator driven by the radial countershaft, in particular through the transfer means and the tangential transfer shaft. The generator makes it possible to convert kinetic energy produced by the turbine engine into electrical energy, provided for example for an aircraft carrying the turbine engine. The electric generator is directly driven for example by a rotating accessory arm of the accessory case.

In a particular embodiment, an annular space is formed between the housing and a nacelle inside which the turbine engine is accommodated, with said annular space being radially smaller in dimension at the angular sector where the transfer case is located than at the angular sector where said at least one rotatably driven equipment is located, and the device may for example be an auxiliary device such as an electric generator and mounted on an accessory case so that the assembly has radial overall dimensions much larger than the transfer case.

Other details, characteristics and advantages of the invention will appear upon reading the following description given by way of a non restrictive example while referring to the appended drawings wherein.

Figure 1:
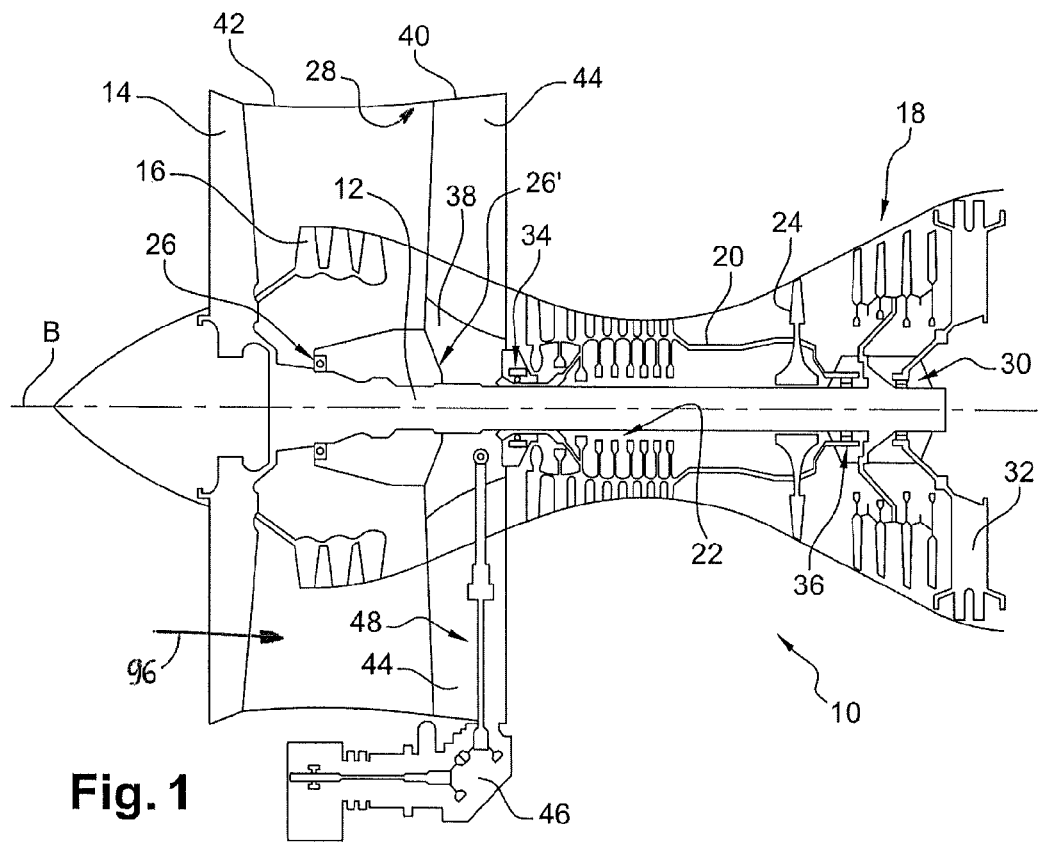
FIG. 1 is an axial section of a general view of a twin spool turbofan engine according to a known prior art.

A known turbofan engine 10 with its various major components is schematically illustrated in FIG. 1. It comprises a first shaft 12 connecting, upstream, a fan rotor 14 and the first stages 16 of the compressor to the low pressure turbine 18; this assembly forms the low pressure or BP cylinder. Coaxial with the first shaft, a second drum-shaped shaft 20, connects the high pressure stages 22 of the compressor 24 to the high pressure turbine; the assembly forms the high pressure or HP cylinder, with the combustion chamber (not shown). The shaft 12 is supported, upstream, by the bearings 26 and 26' mounted on the housing 28 which is designated as the intermediate housing and, downstream, by the bearing 30 mounted on the exhaust housing 32. The HP shaft is supported here by the bearing 34 of the intermediate housing 28 and, downstream from the shaft 12, through the inter-shaft bearing 36.

In the FIGS. 1 and 3, the longitudinal axis of the turbine engine is marked with a B and the secondary air stream of the turbine engine bears reference 96, sweeping over the arms 44 mentioned below.

Figure 2:
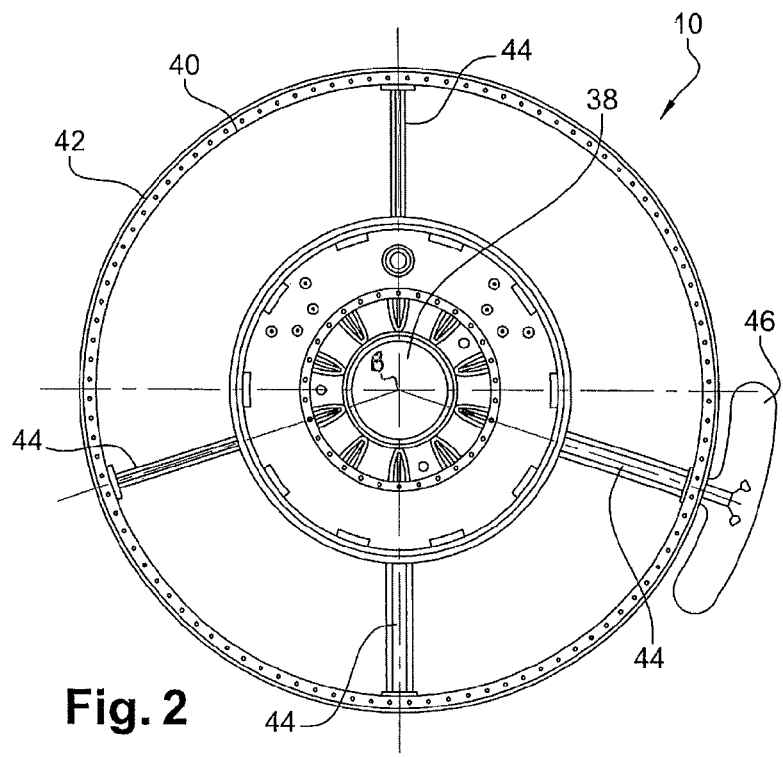
FIG. 2 is a view from downstream of an intermediate housing used in the turbine engine of FIG. 1.

As illustrated in FIGS. 1 and 2, the intermediate housing 28 comprises an external shroud 40 in the extension of the fan housing 42. Radial guidance arms 44 connect the shroud 40 to a hub 38 supporting the bearings 26, 26' and 30. Such intermediate housing 28 at least partially consists of a part cast in one piece whereon the radial arms can be added. Auxiliary devices such as electric generators and fuel or oil pumps are mounted on an accessory case 46, as is known, which is called AGB in the field of activity. The accessory case 46 is mounted outside the fan housing 42 at a location which allows access for maintenance, in an angular sector of the turbine engine 10 corresponding to the eight area of the latter. As a matter of fact, the turbine engine is intended to be mounted in a particular orientation, with an upper portion corresponding to the twelve area, and a lower part corresponding to the six area. The machines are mechanically connected to a central shaft 12, 20 of the turbine engine by means of a radial countershaft 48, which is accommodated in a radial guidance arm 44 of the intermediate housing 28 extending approximately in the eight angular sector, directly towards the accessory case 46. Two other guidance arms 44 of the intermediate housing 28 extend in the twelve and six areas, and are used for example for guiding the electrical harnesses and the fuel, oil, etc. pipes.

Such a structure comprising more than two guidance arms 44 on the intermediate housing 28 has the disadvantages mentioned above.

Figure 3:
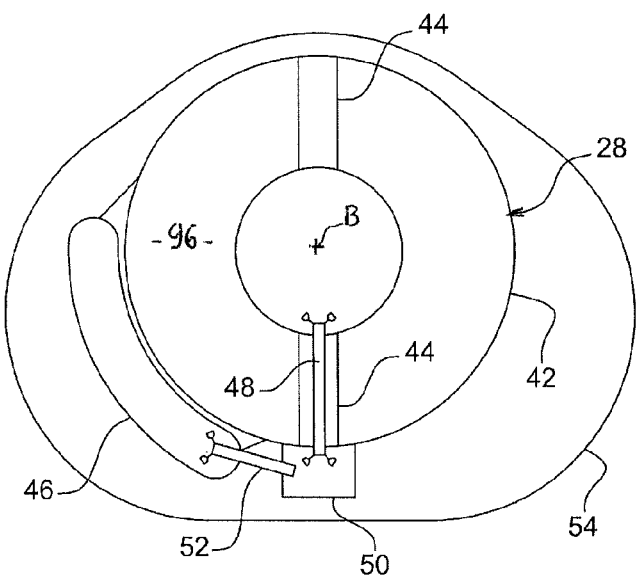
FIG. 3 is a diagram from upstream of a propulsion system architecture, with the turbine engine.
Figure 4:
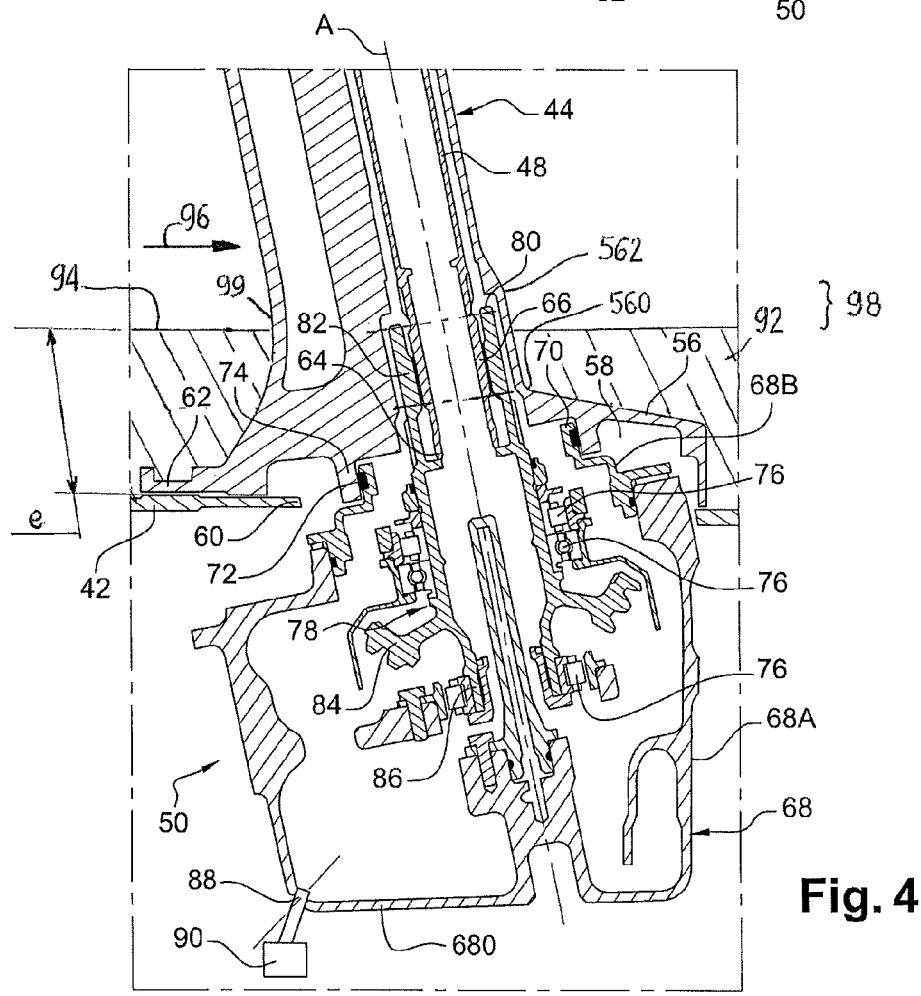
FIG. 4 is a more detailed view of the transfer case of FIG. 3, and of the external end of the guidance arm where the idler arm driving the devices of the accessory case extends, in an axial section.

The invention therefore proposes a solution illustrated in FIGS. 3 and 4. FIG. 3 shows that only two guidance arms 44 of the intermediate housing 28 have been kept at twelve and six, which improves the flow of streams at least in the secondary jet of the turbine engine, and therefore improves the aerodynamic performances. The turbine engine here is a turbofan engine, and each guidance arm goes through a secondary flow jet of the turbine engine.

In order to mechanically connect a central shaft of the turbine engine with at least one device, in this example a set of devices mounted on an accessory case 46 which is located in the eight area, the radial countershaft 48 goes through the six guidance arm 44. The external end of the countershaft 48 is connected to a transfer case 50, which is used to transfer the rotational movement of the countershaft 48 towards the accessory case 46, through a transfer shaft 52 for example substantially tangential to the fan housing 42, and connecting the transfer case 50 to the accessory case 46. It should be noted that the radial countershaft 48 is not necessarily perpendicular to the central shaft of the turbine engine, and can form an angle relative to a strictly radial direction, i.e. perpendicular to the central shaft, as seen in FIG. 4.

At least one device, not shown in the figure and comprising, for example an electric generator, is mounted on the accessory case 46, so that the assembly consisting of the accessory case and the device have a radial overall dimension much more important than that of the transfer case. These differences in the radial overall dimension of the members around the annular fan housing 42 result in that a nacelle 54 accommodating the turbine engine 10 preferably has a non axially symmetrical shape, as shown in FIG. 3 and explained in greater details below.

Furthermore, it should be understood that, instead of an accessory case, having a single device, such as an electric generator can be considered. A single device consisting of another transfer case remote from the transfer case 50 and from which at least one transfer shaft for driving furthest apart devices starts, can be considered.

In the present document, the housing 42 is considered as an annular housing which comprises the fan housing and the external shroud of the intermediate housing. The annular housing 42 is not necessarily cylindrical, and may thus have a diameter that varies according to the longitudinal position considered in the direction of the central axis of the turbine engine. Moreover, as can be seen in FIG. 3, dimensional constraints are imposed by the nacelle 54 wherein the turbine engine 10 is accommodated. In particular, the nacelle 54 has a distance to the central axis of the turbine engine, which varies in the circumferential direction. More particularly, the nacelle surrounds the annular housing 42 of the turbine engine so as to leave an annular gap of variable radial dimension around the annular housing. In order to reduce the overall height of the nacelle, the radial space available at six, on the turbine engine, for the transfer case, is relatively small, and has thus required the development of a particular embodiment of the transfer housing 50, shown in greater details in FIG. 4.

FIG. 4 shows that the radially external end of the guidance arm 44 at six, which is hollow, and wherein the radial countershaft 48 extends has a widened portion 56 through which it is connected to the fan housing 42 of the turbine engine from the inside. Thus, the guidance arm 44 has a widened portion 56, here in one piece therewith.

The widened portion 56, which is hollow, as is the guidance arms 44, thus forms a cavity, or a recess 58, in the external end of said guidance arm. More particularly, the wall defining the guidance arm 44, moves away from the A axis of the countershaft 48, at the external end thereof with respect to the central axis of the turbine engine, before connecting with the fan housing 42 all around an opening 60 of the annular housing 42 formed for the passage of the countershaft 48. The extended portion 56 thus opens into the opening 60 of the annular housing.

A flange 62 is formed on the wall of the guidance arm 44 and bears against the fan housing 42 from the inside, in order to allow a fixing thereof. The external end 64 of the countershaft 48 is formed at the enlargement 56 at a radial distance from the central axis of the turbine engine shorter than the radius of the fan housing 42. The external end 64 of the countershaft 48 comprises longitudinal splines 66 formed on the external surface thereof.

The transfer case 50 is arranged partly in the opening 60 of the fan housing 42 and in the cavity 58 of the guidance arm 44 formed by the widened portion 56. The transfer case 50 comprises a stationary external enclosure 68 which comprises a main portion 68A and a linking portion 68B sealingly connected to the main portion 68A. Such linking portion 68B is used to connect the enclosure 68 to the widened portion 56 of the guidance arm, and has a, for instance, circular opening delimited by a cylindrical wall 70 surrounded by an annular seal 72. This opening is arranged inside a coaxial cylindrical wall 74 formed as a protrusion from the widened portion 56 of the guidance arm, so as to sealingly press the gasket 72 between the two cylindrical walls 70, 74. The cavity inside the guidance arm 44, wherein the countershaft 48 extends, and the cavity inside the enclosure thus sealingly communicate.

A hollow shaft 78, with the same A axis as the axis of the countershaft 48 is held inside the enclosure 68 by a series of bearings 76. The end 80 of the hollow shaft 78 directed towards the central axis of the turbine engine is formed about the splined end 64 of the countershaft 48, in the guidance arm 44. More specifically, longitudinal splines 82 are formed on the internal wall of the hollow shaft 78 and engage between the splines 66 of the countershaft 48 so as to rotationally secure the two shafts 48, 78. A bevel gear 84 is provided at the other end of the hollow shaft 78 remote from the central axis of the turbine engine. During assembly, the linking portion 68B is connected to the main portion 68A of the enclosure 68 once the aforementioned elements of the transfer case 50 are placed in the enclosure 68.

The bearings 76 are ball or roller bearings, and are used to guide in rotation the hollow shaft 78 in the enclosure 68 of the transfer case 50. A roller bearing and a ball bearing are formed about the hollow shaft 78 between the splines 82 and the bevel gear 84, and a roller bearing surrounds an end portion 86 of the hollow shaft 78 which extends further radially outwards than the bevel gear 84. It may be noted that the bearing 76 located closest to the central axis of the turbine engine is partly located at the opening 60 of the fan housing 42. More particularly, the bearing 76 may be positioned at an opening of the main portion 68A of the enclosure 68 whereto the linking part 68B is connected.

Two ports 88 are formed each in a bottom wall 680 of the enclosure 68 of the transfer case 50, and are spaced from one another in a transverse direction of the turbine engine. At least one of the two ports 88 thus constitutes a low point of the enclosure 68, in almost all the attitudes of the flight envelope of the aircraft equipped with the turbine engine, specifically in case of a bend even with a large angle. Such two ports 88 are used to drain the oil circulating in the enclosure and the guidance arm 44 for lubricating and cooling the bearings. At least two oil recovery pumps are respectively connected to the two oil discharge ports 88 to achieve an oil drain circuit of the transfer case 50, thereby changing the oil in all attitudes of the flight envelope. The pumps 90 drain oil either simultaneously or in turns, depending on the attitudes of the flight envelope. Providing at least another port 88 associated with an additional dedicated recovery pump can be considered. In the figure, as the two ports 88 are located one behind the other, only one port is shown.

The tangential transfer shaft 52 can be easily engaged with the bevel gear 84 of the hollow shaft 78 of the transfer case 50, through an opening of the transfer case not visible in the figure, since it is oriented perpendicularly to the sectional plane of FIG. 4, so as to realize the assembly of FIG. 3.

FIG. 4 shows the preferred presence of a sound attenuation panel 92 at the radially external end of the guidance arm 44.

The acoustic panel 92 preferably extends inside the annular housing 42, as shown.

Maximum efficiency will then be given to the limitation of noise and vibration in this area, without hindering the implementation of the transfer case 50 opposite the opening 60 of the annular housing.

As a matter of fact, it is advisable for the annular housing of the turbine engine 42 to be internally covered with a sound attenuation panel comprising a radially internal surface 94 swept over by a stream 96 of secondary air from the turbine engine, and wherein at least 90% of the volume of the widened portion 56 of the guidance arm 44 is located in the radial thickness e (parallel to the A axis which is thus radial with respect to the B axis of the engine) of the sound attenuation panel 92.

It should be considered that the guidance arm 44 internally widens, with its portion 56, from the change in slope 560 or 562 located at the splines 82 and 66 (such areas may change between the two levels of dot and dash lines, FIG. 4).

And even more preferably, a part of the widened portion 56 of the guidance arm representing less than 10% of the volume of said widened portion (a radial region 98 in FIG. 4), will extend beyond the radially internal surface 94 of the sound attenuation panel 92 will be contoured (for instance, the portion 99) so as to minimize the impact thereof on the flow of the secondary air stream 96 around the guidance arm 44.

An example of this is shown in FIG. 4.

Maximum efficiency will then be given to the limitation of noise and vibration in this area, without hindering the implementation of the transfer case 50 opposite the opening 60 of the annular housing or unduly disturbing the flow 96.

What is claimed is:

1. A turbine engine extending along a motor axis and comprising:
   at least one hollow guidance arm radially extending relative to the motor axis from a hub to an annular housing of the turbine engine, having a radially external end secured to said annular housing and opening out in an opening of said annular housing,
   one radial countershaft positioned in said guidance arm for rotatably driving at least one device arranged at the periphery of said annular housing,
   further comprising a transfer case positioned facing the opening of the annular housing and comprising rotational power transfer means between the radial countershaft and the device, and wherein the guidance arm is equipped, at the radially external end thereof, with a widened section by which it opens out in the opening of the annular housing and in which a portion of the transfer case is accommodated, wherein the rotational power transfer means of the transfer case comprises a hollow shaft comprising:

splines inside a radially internal end of the hollow shaft, with said splines being engaged between external splines formed at a radially external end of the countershaft, and a bevel gear coaxial with and located between end portions of the hollow shaft, with the hollow shaft of the transfer case being held by bearings, wherein one of the bearings extends further radially outwards than the bevel gear, and positioned inside an enclosure of the transfer case and rotationally secured to the countershaft, with said enclosure being at least partly positioned in the widened portion of the guidance arm radially inside the annular housing.

2. The turbine engine according to claim 1, wherein the enclosure of the transfer case comprises a main portion and a linking portion sealingly connected to the main portion, and at least one of said bearings is positioned at an opening of the main portion whereto the linking portion is connected.

3. The turbine engine according to claim 1, wherein at least one of said bearings is partially radially positioned at the opening of the annular housing.

4. The turbine engine according to claim 1, wherein the enclosure of the transfer case comprises an opening through which the hollow shaft of the transfer case extends, with said opening being sealingly connected to the widened portion of the guidance arm so as to form a single sealed cavity comprising the inside of the guidance arm and the inside of the enclosure, with sealing means connecting the enclosure with the guidance arm being arranged inside the annular housing of the turbine engine.

5. The turbine engine according to claim 1, wherein the radially external end of the radial countershaft is located radially inside the annular housing of the turbine engine.

6. The turbine engine according to claim 1, comprising a transfer case oil drain circuit, wherein at least two oil recovery pumps are respectively connected to two oil discharge ports each passing through a bottom wall of the transfer case and distant from each other in a transverse direction of the turbine engine.

7. The turbine engine according to claim 1, comprising no more than two guidance arms, including an upper guidance arm and a lower guidance arm extending substantially vertically from two opposing sides of the hub to the annular housing of the turbine engine, with the transfer case being positioned under the lower guidance arm, wherein a transfer shaft rotatably connects the transfer case to an accessory box of the turbine engine arranged at the periphery of the annular housing of the turbine engine in an angular sector different from the angular sectors where the upper guidance arm and lower guidance arm are located.

8. The turbine engine according to claim 7, wherein the accessories case carries an electric generator driven by the radial countershaft via the rotational power transfer means and the transfer shaft.

9. The turbine engine according to claim 1, wherein the annular housing of the turbine engine is internally covered with a sound attenuation panel comprising a radially internal surface swept over by a secondary air stream from the turbine engine, and wherein at least 90% of the volume of the widened portion of the guidance arm is located in the radial thickness of the sound attenuation panel.

10. The turbine engine according to claim 9, wherein a portion of the widened portion of the guidance arm, representing less than 10% of the volume of said widened portion extends beyond the radially internal surface of the sound attenuation panel and is so contoured as to minimize the impact thereof on the flow of the secondary air stream around the guidance arm.

11. A propulsion system comprising a turbine engine according to claim 1, which is arranged inside a nacelle, with an annular space being formed between the housing of the engine and the nacelle, with said annular space being radially smaller in dimension at the angular sector where the transfer ease is located than at the angular sector where said at least one rotatably driven device is located.

\* \* \* \* \*